Dec. 1, 1931.     C. A. SWANSON     1,834,008
BRACKET FOR GRAIN LIFTERS
Filed July 23, 1928
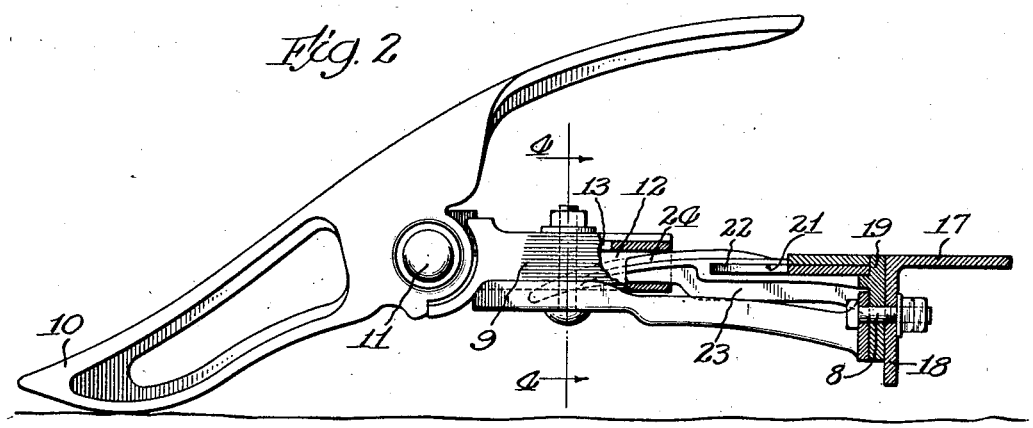
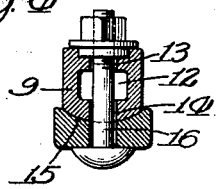
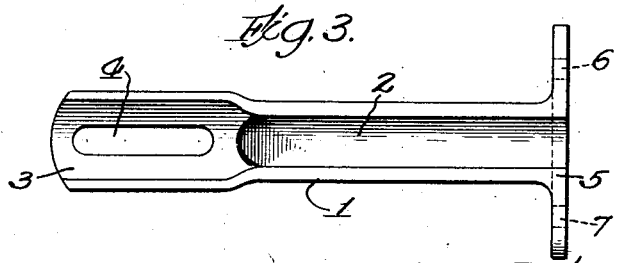
Inventor:
Charles A. Swanson
By: Wallace R. Lane. Atty.

Patented Dec. 1, 1931

1,834,008

UNITED STATES PATENT OFFICE

CHARLES A. SWANSON, OF CHICAGO, ILLINOIS, ASSIGNOR TO THE WHITAKER MANUFACTURING COMPANY, OF CHICAGO, ILLINOIS, A CORPORATION OF ILLINOIS

BRACKET FOR GRAIN LIFTERS

Application filed July 23, 1928. Serial No. 294,654.

The present invention relates to supporting means for grain lifters used with the cutting mechanism of a harvesting machine or the like.

Among the objects of the invention is to provide a novel means, such as a bracket or like supporting member, adapted to be associated with a guard or finger device of a cutting mechanism of a harvesting machine for supporting, preferably in adjusted relation, a grain pick-up or lifter. The supporting part of the bracket is so designed that the lifter may be adjustably connected or attached whereby adjustment may be made both longitudinally and transversely. The bracket may also have a recess or groove in which the guard member may rest or fit to aid the rigidity of the device, and the lifter may have a recess in which an end, such as a cut-off end, of a guard member may fit to aid in holding the parts alined and also to aid in the rigidity of the assembly.

Other objects, advantages, capabilities and features are comprehended by the invention as will later appear and as are inherently possessed thereby.

Referring to the drawings:

Fig. 1 is a top plan view with parts in section of the device associated with a part of a cutting mechanism of a harvesting machine;

Fig. 2 is a side view with a part in transverse section of the same;

Fig. 3 is a top plan view of the supporting bracket; and

Fig. 4 is a transverse sectional view taken in a plane represented by line 4—4 in Fig. 2 of the drawings.

Referring now more in detail to the drawings, the embodiment selected to illustrate the invention is shown as comprising a body portion 1, having a recess or groove 2 and at its forward end portion being provided with a concaved seat 3 having an elongated slot 4, as clearly shown in Fig. 3. At the rear end, the body is provided with a flange 5, having bolt apertures 6 and 7 through which bolts 8 may pass for securing the flange to the cutter mechanism of a harvesting machine.

Upon the seat 3 is supported a shank 9 to which is pivotally connected a toe device 10 adapted to enter beneath the low lying grain on the ground and raise the low lying grain whereby the same may be properly engaged by the guard members of the sickle of the cutting mechanism. The lifter has a hinge or pivot 11 and an enclosed spring adapted to permit a certain amount of upward yielding movement of the lifter as the same travels over the ground. The shank of the lifter has a longitudinal recess or passage 12, and upper and lower slots 13 and 14. The under surface 15 of the shank is curved or convex so as to substantially fit with the curvature of the seat 3 of the support. A securing bolt 16 passes through the slots 4, 14, and 13 and also through the recess or passage 12, and these slots and passage are of substantially greater width than the body of the bolt 16 whereby lateral angular adjustment may be made of the shank 9 before the bolt is tightened in place. The slots are elongated so that the shank may also be adjusted longitudinally on the support as desired before the bolt 16 is tightened.

The harvester mechanism comprises a frame having an angle member 17 with a depending front flange 18, provided with suitable apertures for the passage therethrough of the bolts 8. To the front face of the flange 18 is secured a flange 19 of the sickle mechanism, the latter having a plurality of guard members 20 at suitable intervals, and a raceway for the operation of the sickle 21 and cutters 22. Beneath each guard member 20 is formed an integral web or flange portions 23, such that when the support or bracket is secured in place, such web 23 may rest in the groove 2 of the body portion 1 of the bracket. For the purpose of attaching the lifter, which are located at intervals, one of the guard members 20, such as guard member 20ª may be shortened by cutting off its end and the end portion 24 thereof made to extend into the recess or passage 12 provided in the shank 9. The guard member is cut off so that it will not interfere with the bolt 16 when in its rearmost position. The projecting of the end 24 in this recess, will aid in aligning the lifter member with reference to the guard member 20ª and also will aid in the rigidity of the assembly of the device. It will be noted that the flange 5 is in contact against the front face of the flange 19 and the latter is in contact against the front face of the flange 18, and the three are bound or secured together by the bolts 8 passing through suitable apertures provided in the three flanges. This provides for a facile way of assembling the parts as well as making the same very rigid.

While I have herein described and upon the drawings shown an illustrative embodiment of the invention, it is to be understood that the same is not limited thereto but may comprehend other combinations, arrangements of parts, details and features without departing from the spirit thereof.

Having thus disclosed the invention, I claim:

1. The combination with the frame of a harvesting machine having a depending flange, of a bracket having an attaching flange at its rear end for engagement with said depending flange, the other end of said bracket having a seat in its upper surface, means for securing the flanges together, a grain lifter having a shank complemental to and resting upon said seat, and means for securing said shank to said seat.

2. The combination with a bracket having its rear end provided with an attaching flange for engagement with a harvester frame, and provided at its other end with a seat in its upper surface, of a grain lifter having a shank, said seat and said shank having complemental engaging portions capable of relative longitudinal and angular adjustment, and means normally preventing relative movement of said shank and said seat.

3. The combination with a bracket having supporting means at its rear end and provided at its other end with an elongated seat in the upper surface thereof, said seat being of concave form in cross section, of a grain lifter having a shank engaging said seat, said shank and said seat having complemental engaging portions capable of relative longitudinal and angular adjustment, and means normally preventing relative movement of said shank and seat.

4. The combination with a bracket having one end provided with a seat in its upper surface, said seat having a longitudinal slot therein, of a grain lifter having a shank resting upon said seat, said shank and said seat having complemental engaging portions capable of relative longitudinal and angular adjustment, said shank also having a longitudinal slot positioned to register with the slot of said seat, and a bolt extending through said slots so as to secure said shank to said bracket, the diameter of the bolt being less than the width of the slots to provide clearance for said relative angular adjustment.

5. A bracket for grain harvesters comprising a bracket consisting of a shank having its rear end provided with an attaching flange having a flat rear face for engagement with a depending flange of a harvester machine, the ends of said attaching flange projecting laterally from said shank, the other end of the shank having a seat in its upper surface, a grain lifter having a shank complemental to said seat, and means for securing the shank of the grain lifter to said seat.

6. A bracket for grain lifters comprising a body having one end provided with a vertically disposed flange and the other end provided with a widened concaved seat in its upper surface.

7. A bracket for grain lifters comprising a body of concavo-convex cross section provided at one end with a vertical attaching flange and having the top surface of its other end provided with a widened concaved seat.

In witness whereof, I hereunto subscribe my name to this specification.

CHARLES A. SWANSON.